United States Patent [19]

Horvath

[11] E Re. 29,929

[45] Reissued Mar. 13, 1979

[54] DEVIATED CONDUCTOR DRIVING SYSTEM

[75] Inventor: Lajos (Louis) Horvath, Norwich, England

[73] Assignee: Gurtler, Hebert & Co., Inc., New Orleans, La.

[21] Appl. No.: 885,971

[22] Filed: Mar. 13, 1978

Related U.S. Patent Documents

Reissue of:

[64] Patent No.: 4,027,734
Issued: Jun. 7, 1977
Appl. No.: 639,857
Filed: Dec. 11, 1975

[51] Int. Cl.[2] ..... E21B 7/08

[52] U.S. Cl. ..... 175/9; 175/45; 175/61; 175/73

[58] Field of Search ..... 175/9, 19, 45, 61, 62, 175/73, 74, 75, 171, 402, 403, 405; 166/0.5, 0.6; 61/53, 53.5, 53.68

[56] References Cited

U.S. PATENT DOCUMENTS

| | | | |
|---|---|---|---|
| 1,900,163 | 3/1933 | Dana et al. | 175/61 X |
| 2,018,007 | 10/1935 | Brewster | 175/75 |
| 2,420,447 | 5/1947 | Schadel | 166/113 |
| 2,500,267 | 3/1950 | Zublin | 175/75 |
| 2,565,794 | 8/1951 | Young | 175/75 X |
| 2,873,092 | 2/1959 | Dwyer | 175/61 |
| 3,260,318 | 7/1966 | Neilson et al. | 175/75 |
| 3,586,116 | 6/1971 | Tiraspolsky et al. | 175/74 |
| 3,610,346 | 10/1971 | Ziober | 175/61 X |
| 3,670,507 | 6/1972 | Mott et al. | 175/61 X |
| 3,687,204 | 8/1972 | Marshall et al. | 175/9 |
| 3,722,605 | 3/1973 | Isham | 175/61 X |
| 3,878,903 | 4/1975 | Cherrington | 175/73 X |
| 3,899,032 | 8/1975 | Rees et al. | 175/9 |

FOREIGN PATENT DOCUMENTS

| | | | |
|---|---|---|---|
| 203116 | 3/1966 | Sweden | 175/61 |

*Primary Examiner*—Ernest R. Purser
*Assistant Examiner*—Richard E. Favreau
*Attorney, Agent, or Firm*—C. Emmett Pugh & Associates

[57] ABSTRACT

A method and technique for a deviated (non-vertical) emplacement of a conductor casing at a desired [curver] *curve* and orientation in order to facilitate directional drilling of a well in the substratum of an offshore well site. The method provides for the installation of a relatively short, offset portion of the conductor casing at only the bottom of the conductor pipe string and thereby utilizing this offset portion to force the conductor string in a desired direction and orientation by driving or forcing the conductor casing through a substratum in such a manner that the casing will assume the desired curvature and direction as it advances through the substratum. In addition to the offset or dog-leg segment at the bottom, key-way type guide bars can be added in the longitudinal direction to resist undesired rotation of the conductor pipe.

12 Claims, 5 Drawing Figures

DEVIATED CONDUCTOR DRIVING SYSTEM

Matter enclosed in heavy brackets [ ] appears in the original patent but forms no part of this reissue specification; matter printed in italics indicates the additions made by reissue.

BACKGROUND OF THE INVENTION

1. Field of Invention

The present invention relates to a system (method and structural aspects) for emplacement of a conductor casing at a desired curve and orientation from an offshore platform in order to facilitate directional drilling of a well in the substratum of an offshore well site.

2. Prior Art

The reasons for directional drilling of a hydrocarbon producing well are well known. For instance, in connection with offshore production, it is the usual practice to place a stationary platform in a desired location for the optimum production of substrata hydrocarbons. From this stationary platform a number of wells are drilled.

Obviously, because of the size and location of the hydrocarbon deposits, it is necessary to penetrate the substrata at various locations according to the geological formations available for production. In order to obtain maximum production from a given platform with a number of well locations, it is necessary to drill into the substrata at various predetermined depths and orientations.

However, the initial step in the drilling process includes the installation of a surface casing which is normally, a steel pipe of relatively large diameter. In the case of offshore drilling this surface casing is commonly called the "conductor pipe". This portion of the casing system through which the well is drilled provides the "hole in the water" through which the remaining smaller casing and the drill string can be installed. The primary function of this conductor pipe is to provide the hole in the water as mentioned as well as a seal below the mudline to a predetermined depth according to the requirements of the soil conditions encountered.

Normally, the conductor pipe is installed to a depth of from 100 to 300 feet below the mudline or sea bottom. After the installation of the conductor pipe the remaining smaller casings are placed through this pipe of the desired depth and the well is drilled by means of a drill string through the series of casings.

In order to achieve a specific direction or orientation of the drill string, a number of techniques have been developed for diverting or orienting the drill string. In the usual pipe conductor, the conductor is installed in a more or less true vertical position due to the standard techniques of installation of such conductors. All directional drilling or deviated work is done below the bottom of the pipe conductor.

However, it has recently been determined that there are certain advantages to orienting the conductor pipe in a given direction by means of curving or bending the conductor below the mudline in such a manner as to orient the drilling operation towards a given target location as it leaves the end of the pipe conductor. By this means a number of advantages are gained. It is possible to reach shallower hydrocarbon formations than can be reached by diverting the drilling operation after leaving a straight vertical conductor. Greater dispersion of drilling operations can be achieved from a central single platform location. This method can also be used to avoid conflicts with previously installed conductors or operating wells on an existing platform.

In order to achieve the deviation or curvature of pipe conductors there exist three basic patents involving methods different from the novel method included herein. U.S. Pat. No. 3,670,507 (issued June 20, 1972 to Mott & Ziober, assigned to Texaco Inc.) as well as U.S. Pat. No. 3,687,204 (issued Aug. 29, 1972 to Marshall, et al, assigned to Shell Oil Co.) both depend upon the use of a series of offset staggered guides in the platform structures — spaced so as to either accommodate a continuously precurved conductor pipe or force a conductor pipe into a curved form by means of these guides.

In addition, there exists U.S. Pat. No. 3,610,340 (issued Oct. 5, 1971 to Ziober, assigned to Texaco Inc.) which contemplates the bending or deviation of the pipe conductor by forcing it into a predrilled hole in a very hard, consolidated stratum of soil. This latter method has obvious limitations to a specific type of soil. Also, it involves the necessity for predrilling in every case.

The first two methods mentioned involving the use of a series of guides require that the platform be specifically designed for curved conductors at the design stage. That is, a platform which has been built for the normal vertical conductor installation with vertically aligned guides cannot utilize either of these methods. Thus, because of the pre-curvature of the pipe, there are limited possibilities for deviations from the predetermined curvature in the field.

For other general, prior art background information, reference is also had to U.S. Pat. No. 3,451,493 (issued June 24, 1969 to Storm) as a typical example of what is known in the art as "slant drilling" wherein the entire drilling derrick is tilted to produce directional drilling. Other general interest prior art patents are U.S. Pat. Nos. 3,610,346 (issued Oct. 5, 1971 to Ziober, assigned to Texaco Inc.) and 3,685,300 (issued Aug. 22, 1972 to Mott, assigned to Texaco Inc.), the former using predrilled or pre-formed guide passages in the substratum and a backward drag shoe section (element 26) at the end of the casing, while the latter uses the basic support legs of the platform which have been pre-curved as guides for directional drilling.

General reference is also had to U.S. Pat. No. 3,598,190 (issued Feb. 3, 1970 to Pfau, assigned to Shell Oil Co.) which uses deviated drilling in an offshore "Salt Dome Drilling Method" and indicates that the course of the drilling string may be deflected through a formation by use of any of the well known devices for this purpose, such as jetting, whipstocks or knuckle joints. As typical examples of directional drilling by jetting or whipstocking, the following U.S. patents are noted:

| Pat. No. | Inventors | Issue Date |
|---|---|---|
| 1,900,163 | D. Dana, et al | 3-7-33 |
| 2,420,447 | C. H. Schadel | 5-13-47 |
| 2,873,092 | R. P. Dwyer | 2-10-59 |
| 2,953,350 | S. C. Moore | 9-20-60 |
| 3,000,440 | R. H. Malcomb | 9-19-61 |
| 3,593,810 | Roger Q. Fields | 7-30-71 |

Other general interest references in the field of directional drilling in an offshore environment are noted below:

| Pat. No. | Inventors | Issue Date |
|---|---|---|
| 2,565,794 | G. L. Young | 8-28-51 |
| 3,004,612 | D. C. Kofahl | 10-17-61 |
| 3,390,531 | L. P. Johnston, et al | 7-2-68 |
| 3,542,125 | Philip S. Sizer | 11-24-70 |

GENERAL DISCUSSION OF INVENTION

The present invention is applicable to the placement of deviated conductors from an offshore platform, particularly where there is included on the platform a series of standard conductor guides which are vertically aligned, that is, their openings define a straight line in at least a generally vertical direction.

The preferred method of the present invention comprises the method of diverting a conductor by means of welding a short section of the pipe on the bottom of the conductor at a slight angle to the vertical axis of the conductor. Before the vertical staright conductor pipe is inserted in the vertically aligned guides, a short section is cut off and re-welded at a slight angle to the axis of the straight pipe, thus creating what is commonly known as a "dog-leg".

It has been found by experience that this dog-leg is sufficient to divert the conductor in a given direction as the conductor pipe is forced through the substratum soils by means of a pile-driving hammer. The present invention contemplates the installation of the dog-leg, as noted, on the first incremental length only before installation of the pipe conductor through the vertically aligned platform guides, the conductor being otherwise straight.

The orientation of the dog-leg with respect to a given target direction is maintained by means of painting a longitudinal line on each incremental segment of the conductor pipe as it is added on. Thus, when the dog-leg bottom of the conductor pipe reaches the mudline, the direction in which this dog-leg is pointing is predetermined. At this point normal driving operations can commence.

It has been found that the dog-leg will cause the conductor pipe to be diverted in the direction of its orientation. Depending upon the type of soil encountered and based on experience and the amount of dog-leg or offset, the conductor pipe will be found to assume a smooth curved shape which permits the easy installation of smaller casings and eventually the drill string required for final completion of the well.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

The preferred embodiment of the present invention is applicable to the placement of deviated conductors from an offshore platform, particularly where there is included on the platform a series of standard conductor guides which are vertically aligned, and hence the preferred embodiment will be discussed with respect thereto. However it should be understood that some of the benefits of the present invention can be realized even when the guides are not vertically aligned.

Figure 1:
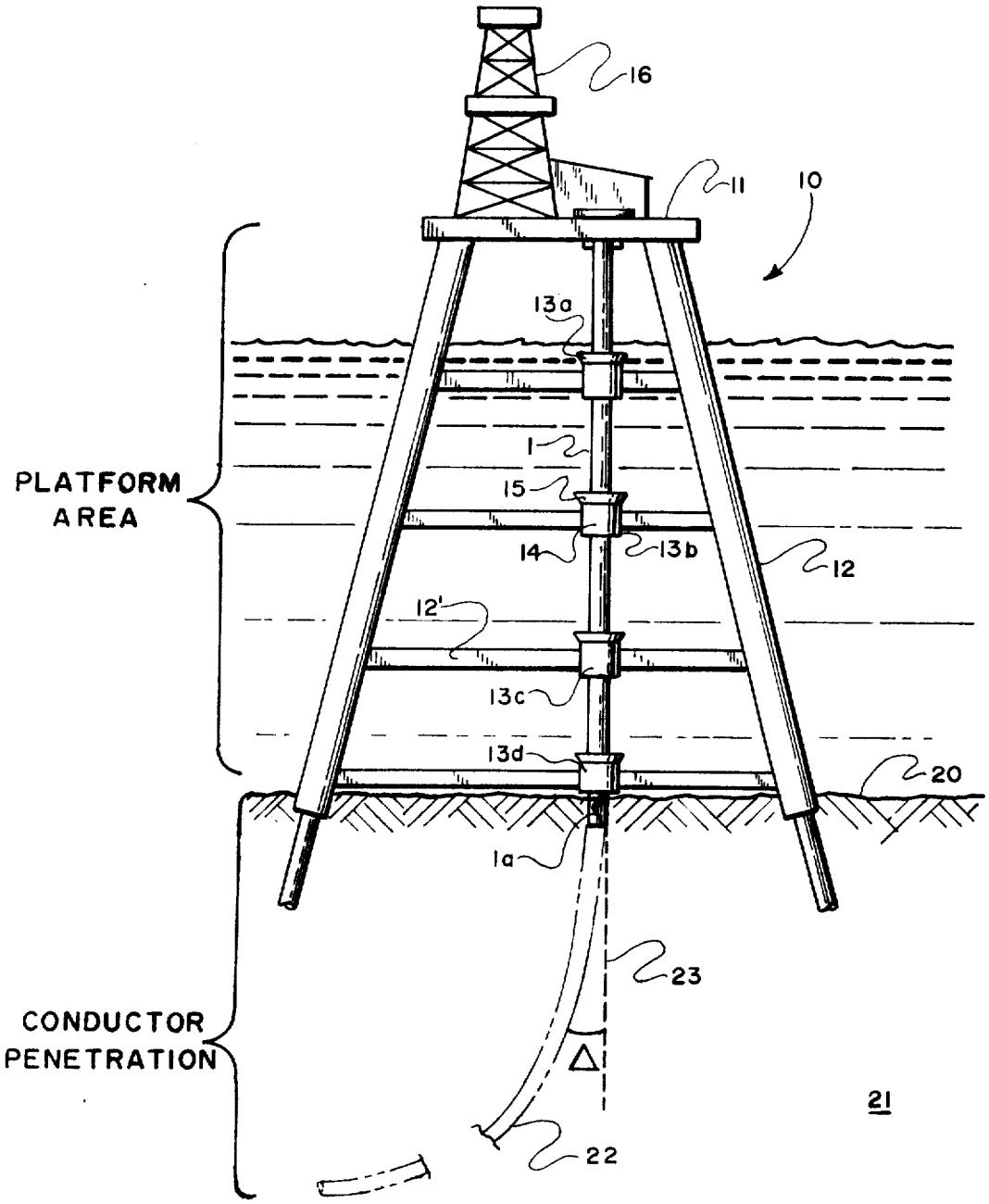
FIG. 1 is a side generalized view of a platform with the preferred embodiment of the conductor of the present invention inserted through the vertical guides, with its dog-leg tip just beginning to penetrate the substrata and the curved course it will take shown in phantom line.

Referring to FIG. 1, a platform structure 10 is illustrated in the normal partially submerged position at an offshore body of water for the purpose of drilling exploratory gas or oil wells. To fully explore the substratum, diverse wells are normally drilled to assume one or more directions radially outward from the platform 10. The marine platform comprises in essence a deck 11 which is supported above the water's surface by downwardly extending legs 12. The illustrated platform lacks uniqueness in itself, being in general of a well known design for a stable vehicle used to drill such offshore wells.

While only two support legs such as 12 are shown, it should be appreciated that this is merely an illustrative embodiment into which the invention is incorporated. The respective legs may constitute any reasonable number depending on the condition of the substrate, the depth of the water and other design and engineering factors.

To provide platform 10 with stability regardless of water turbulence and weather at the offshore location, a series of vertically spaced cross-braces 12' extend between, and are rigidly connected to the respective legs. The number and size of such braces is dependent upon the depth of the water in which the platform is used as well as on other design considerations.

At the platform top side, deck 11 supports a drilling rig 16 which embodies in essence a derrick adapted to raise or lower and suspend a drill string, draw works, and rotary table. One or more cranes (not illustrated) are spaced about the deck to handle materials and transfer equipment to and from boats. The rotary table provides a means for the drill string to be controllably rotated for insertion into the well. In the normal manner, the derrick is disposed in a generally vertical disposition. Further, said derrick as well as the draw works is so mounted as to be horizontally movable about the deck's surface to allow proper orientation over a particular deck opening.

The mobility of the rig units along deck 11 is necessitated to permit alignment over any of the widespread conductors for drilling in diverse directions.

Platform 10 is provided with conductor guide means 13a–13D adapted to receive a downwardly moving, normally straight conductor and to guide the latter vertically down to the mudline 20. Each conductor guide means 13 typically comprises a cylindrical section 14 with a flared top 15.

Conductors are normally formed of an elongated cylindrical member approximately 16 to 36 inches in diameter, fabricated of steel pipe or tubing, normally made up in short incremental lengths varying from forty to sixty feet. Again, following normal practice, conductor pipe 1 is lowered into place from deck 11 until the lower end is disposed adjacent the ocean floor 20. The conductor pipe is progressively elongated by welding incremental sections to the upper end as said conductor is lowered.

Figure 3:
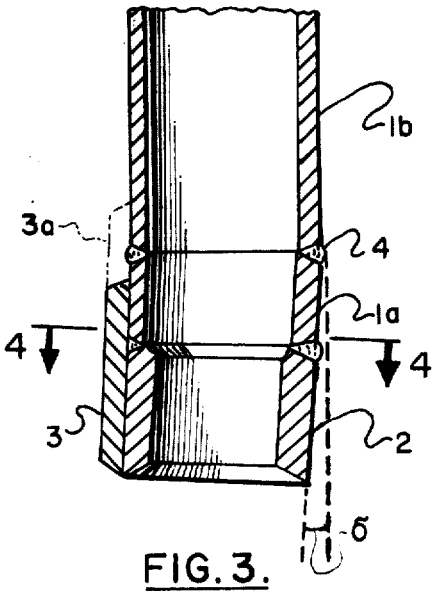
FIG. 3 is a partial, side, vertical cross-sectional view taken down the center-line of the preferred embodiment of the conductor of the present invention, showing the added dog-leg portion at its tip.

As best seen in FIG. 3, a conductor pipe, modified in accordance with the present invention, includes a short dog-leg section 1a welded with an offset from the vertical of angle $\sigma$ to the balance of the initial conductor segment 1b by means of weldments 4. The dog-leg section can be typically 8 feet in length (longer or shorter as may be indicated or required) with a typical offset of approximately one-half inch. This offset may vary from ½ inch to the total clearance allowed by the guides 13.

The amount of this offset is a function of several factors. The limiting factor which governs the maximum offset is the amount of clearance between the outer circumference of the conductor pipe when placed vertically through the guides 13 and the inner surface of the platform guides 13. Normally this clearance is approximately 2 inches. It has been found that an offset of approximately one-half inch is sufficient for most soils. However, this can be increased according to the requirements of the particular soils encountered. Additional offset can be obtained by reducing the diameter of the conductor, thus allowing for greater guide clearance which permits greater offset.

If desired and as illustrated, a standard drive shoe 2 also can be provided at the distal end of the conductor 1.

Figure 4:
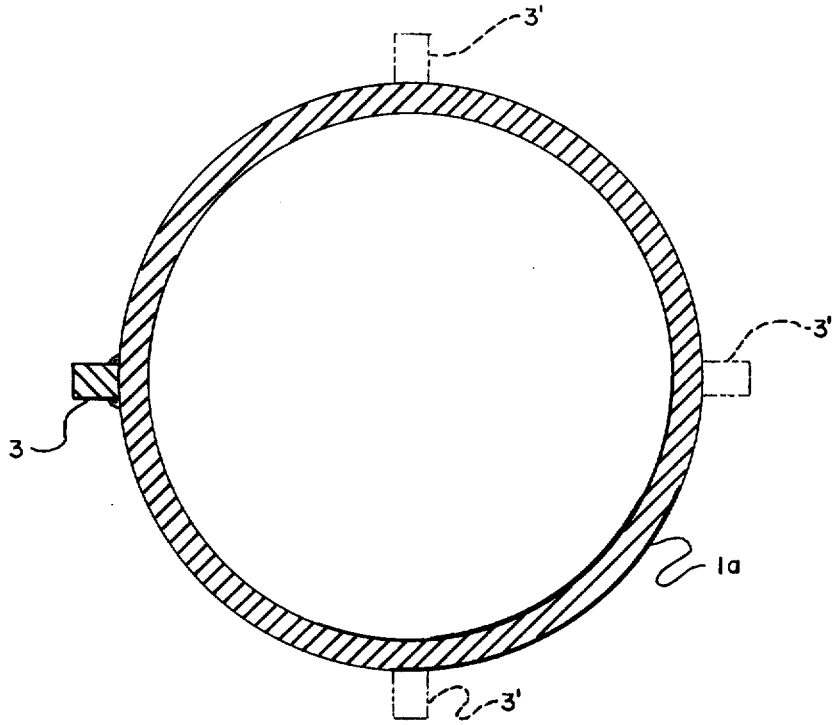
FIG. 4 is a horizontal, cross-sectional view of the conductor taken along section lines 4—4 of FIG. 3.

In addition to the welding of the short dog-leg segment 1a at the bottom of the conductor, it is also possible to prevent or minimize any tendencies of the pipe to rotate by means of welding at least one continuous flat bar 3 of steel along the exterior of this dog-leg segment 1a parallel to the axis of the pipe, as illustrated in FIGS. 3 and 4. It is noted that the location of additional guide bars are suggested in FIG. 4 by means of the phantom lined elements 3'. The size of this flat bar 3 is limited by the guide clearance available. In well consolidated substrata soils the flat bar or bars will act to form a "keyway" which will prevent the end of the pipe 1 from rotating in an undesirable direction. In addition, this guide bar 3 may be extended past the welded connection 4 between dog-leg segment 1a and the straight pipe 1b so as to provide additional reinforcing for this welded joint (note phantom line guide bar extension 3a in FIG. 3).

Figure 2:
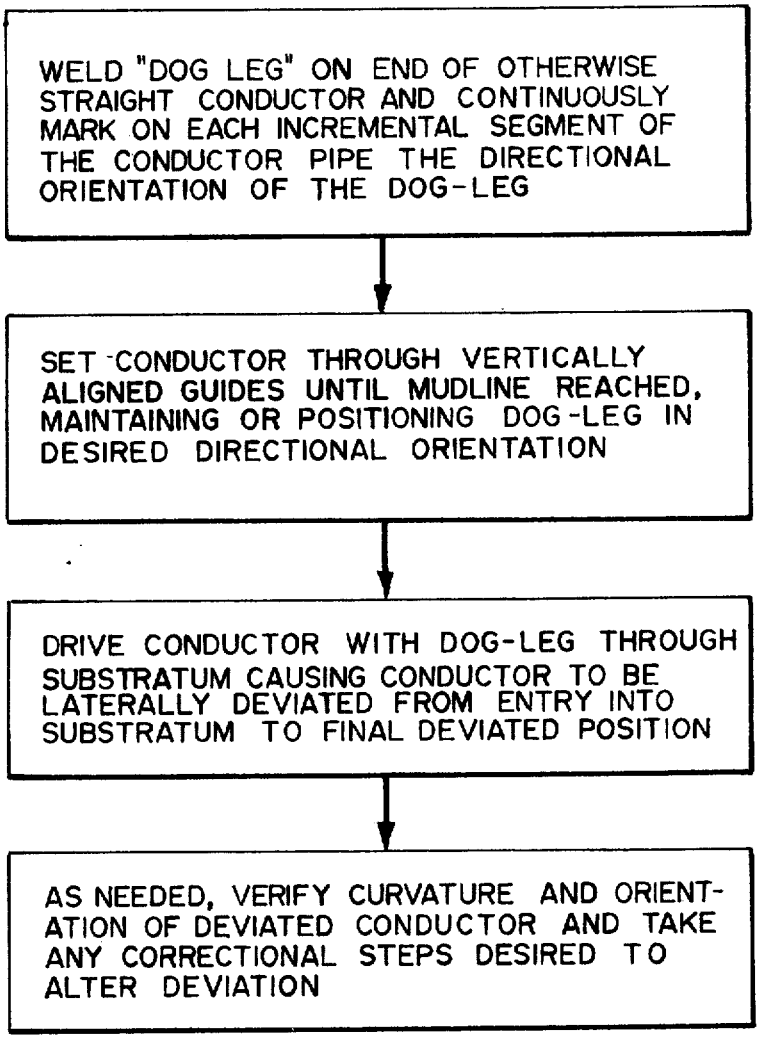
FIG. 2 is a "flow chart" type diagram of the preferred embodiment of the method of the present invention.

As generally illustrated in FIG. 2, the preferred method of the present invention thus comprises the method of diverting a conductor by means of welding a short section of the pipe on the bottom of the conductor at a slight angle $\sigma$ to a vertical axis of the conductor. Before the vertical straight conductor pipe is inserted in the vertically aligned guides 13a–d, a short section 1a is cut off and re-welded at a slight angle $\sigma$ to the axis of the straight pipe, thus creating what is commonly known as a dog-leg.

It has been found by experience that this dog-leg 1a is sufficient to divert the conductor 1 in a given direction from the vertical 23 as the conductor pipe 1 is forced through the substratum soils 21 by means of a piledriving hammer to produce a total angular deviation $\Delta$ which progressively gets greater. The present invention contemplates the installation of the dog-leg 1a, as noted, on the first incremental length only before installation of the total pipe conductor 1 through the vertically aligned platform guides 13, the conductor 1 though being otherwise straight.

The orientation of the dog-leg 1a with respect to a given target direction is maintained by means of painting a vertical line on each incremental segment of the conductor pipe 1 as it is added on. The initial painted line is preferably put on and in line with the same side of the pipe where the dog-leg 1a is pointing and thereafter a painted line is added at each joint matched with the stripe of the preceding joint. Thus, when the dog-leg bottom 1a of the conductor pipe 1 reaches the mudline 20, the direction in which this dog-leg 1a is pointing is predetermined. At this point normal driving operations can commence.

It has been found that the dog-leg will cause the conductor pipe 1 to be diverted in the direction of its orientation. Depending upon the type of soil encountered and based on experience and the amount of dog-leg or offset, the conductor pipe 1 will be found to assume a smooth curved shape (note phantom line element 22 of FIG. 1) which permits the easy installation of smaller casings and eventually the drill string required for final completion of the well.

Figure 5:
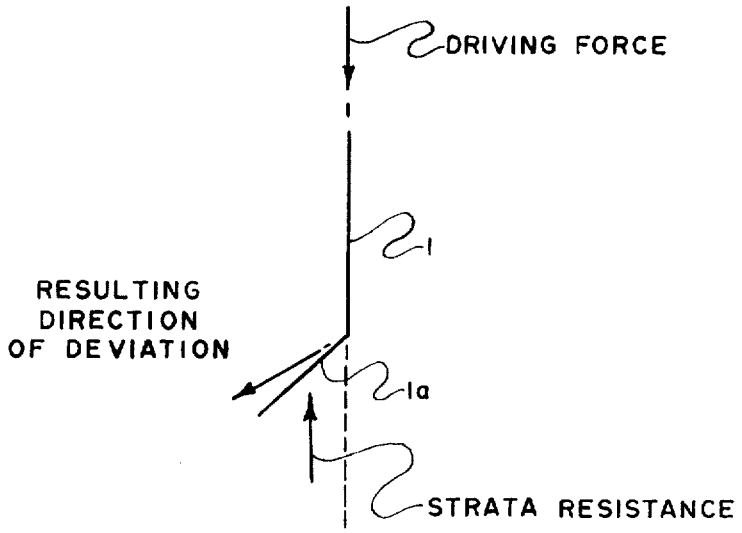
FIG. 5 is a generalized schematic diagram showing the deviating forces that are utilized in the present invention.

As generally illustrated in FIG. 5, the forces which cause the desired deviation are a combination of the driving force down conductor 1 being met by the strata resistance acting on the angular or offset dog-leg segment 1a to produce a resulting direction of deviation.

If excessive curvature should occur due to formation encountered, there is available a method for controlling this excessive curvature. By drilling out through the casing 1 at periodic intervals, a survey of the amount of curvature can be obtained in accordance with standard procedures. If the survey indicates excessive curvature, the stratum of soil below the conductor pipe 1 can be drilled out with an under-reamer type drill or other means for a short distance beyond the end of the conductor 1. This creates a large hole or cavity and it will be found that the end of the conductor pipe 1 will then tend to drop down in such a manner as to decrease the curvature in accordance with the target direction requirements.

If a greater curvature is required, a slight increase in the original dog-leg offset $\sigma$ will cause a greater or sharper curvature radius. The amount of the dog-leg 1a, as noted hereinabove, is based on a study of the soil data as well as field experience with various soils encountered. In addition, some control can be achieved by varying the amount of energy applied to the pipe by means of the pile-driving hammer.

Because many varying and different embodiments may be made within the scope of the inventive concept herein taught, and because many modifications may be made in the embodiment herein detailed in accordance with the descriptive requirements of the law, it is to be understood that the details herein are to be interpreted as illustrative and not in a limiting sense.

What is claimed as the invention is:

1. A method providing a deviated conductor system at an offshore body of water site for directional drilling of wells comprising the following steps:

a. providing an open ended conductor casing of incremental segments;

b. securing an open ended dog-leg section on the distal end of the otherwise straight conductor producing a longitudinally elongated, off-set portion extending over laterally past one side of the outer circumference of the otherwise straight conductor, said off-set being open ended;

c. [setting] *lowering* said conductor [through vertically aligned guides] *down* until the muoline is reached, maintaining or positioning the dog-leg in the desired directional orientation; and d. driving said open ended conductor with said open ended dog-leg section through the substratum causing the conductor to be laterally deviated due to the interaction of the substratum against the offset, lower side surfaces of said dog-leg section from its entry into the substratum to its final deviated position.

2. The method of claim 1 wherein said method further includes the step of:

e. verifying the curvature and orientation of the deviated conductor and taking any correctional steps desired to alter the deviation.

3. The method of claim 1 wherein step b said dog-leg is provided by cutting off the tip of the initial conductor segment and rewelding the tip at a slight angle to the axis of the remaining straight conductor.

4. The method of claim 1 where there is further included in the initial steps the step of:

adding at least one projecting flat bar along the exterior of the conductor parallel to the main longitudinal axis of the conductor to minimize or counteract any tendency of the conductor to rotate.

5. The method of claim 1 wherein in step b there is further included the step of continuously marking on each incremental segment of the conductor pipe the directional orientation of the dog-leg.

6. The method of claim 5 wherein in step b the directional position of the dog-leg is recorded by painting a longitudinal line on each incremental segment of the conductor as it is added onto the preceding ones.

7. A deviated conductor system for an anchored marine structure at an offshore body of water site adapted for directional drilling of wells which comprises:

conductor [guide] *receiving* means carried on said structure being adapted to receive [and guide] a conductor passed downwardly therethrough[, said conductor guide means including discrete guide units spaced vertically apart in at least substantial vertical alignment];

a working deck positioned above the water's surface;

at least one elongated leg supportably connected to said working deck and extending downwardly to the floor of said body of water; and an elongated open ended conductor passing downwardly and [registered] *positioned* in [said discrete guide means of] said conductor [guide] *receiving* means and penetrating substantially down into the substratum of said body of water, and deviated laterally into the substratum a substantial distance away from the [vertical] line defined by [said guide means,] the position of said conductor at the level of said working deck and the point of entry of said conductor into the substratum, said conductor having an open ended, offset dog-leg segment at its distal end offset a slight amount from the longitudinal axis of said conductor, which open ended, offset dog-leg portion extends over laterally past one side of the outer circumference of the main body of the conductor.

8. A conductor for producing a deviated conductor system for an anchored marine structure at an offshore body of water site adapted for directional drilling of wells which comprises:

a substantially long, open ended conductor pipe made up of a multiple number of individual conductor pipe segments welded together; and an open ended offset dog-leg segment secured to its distal end which projects out by means of the offset laterally past one side of the main conductor pipe, the conductor otherwise being made of straight-in-line segments.

9. A method of providing a deviated conductor system at an offshore body of water site for directional drilling of wells comprising the following steps:

a. providing a conductor casing of incremental segments;

b. welding a dog-leg section on the distal end of the otherwise straight conductor;

c. [setting] *lowering* said conductor [through vertically aligned guides] *down* until the mudline is reached, maintaining or positioning the dog-leg in *the* desired directional orientation;

d. driving said conductor with said dog-leg through the substratum causing the conductor to be laterally deviated from its entry into the substratum to its final deviated position;

e. verifying the curvature and orientation of the deviated conductor and taking any correctional steps desired to alter the deviation; and f. if step e indicates excessive curvature, there is included the further step of drilling out the stratum of soil below the tip of the conductor pipe for a short distance beyond the end of the conductor, causing the conductor pipe to tend to drop down to decrease the curvature.

10. A method of providing a deviated conductor system at an offshore body of water site for directional drilling of wells comprising the following steps:

a. providing a conductor casing of incremental segments;

b. welding a dog-leg section on the distal end of the otherwise straight conductor;

c. [setting] *lowering* conductor [through vertically aligned guides] *down* until the mudline is reached, maintaining or positioning the dog-leg in the desired directional orientation;

d. driving said conductor with said dog-leg through the substratum causing the conductor to be laterally deviated from its entry into the substratum to its final deviated position;

e. verifying the curvature and orientation of the deviated conductor and taking any correctional steps desired to alter the deviation; and f. if step "e" indicates insufficient curvature, there is further included the step of providing a dog-leg on subsequent [conductors] *conductor segments* having a greater off-set than originally anticipated.

*11. The method of claims 1, 9 or 10 wherein there is included a set of vertically aligned guides and step "c"*

*includes the step of setting said conductor through the vertically aligned guides.*

*12. The system of claim 7 wherein said conductor receiving means also comprise conductor guide means for guiding a conductor passed downwardly therethrough, said conductor guide means including discrete guide units spaced vertically apart in at least substantial vertical alignment, said conductor also being registered in said discrete guide means and being deviated laterally into the substratum a substantial distance away from the vertical line defined by said guide means.*

* * * * *